United States Patent
Chiu et al.

(10) Patent No.: US 10,606,106 B2
(45) Date of Patent: *Mar. 31, 2020

(54) DISPLAY PANEL AND ELECTRONIC DISPLAY APPARATUS

(71) Applicant: InnoLux Corporation, Miao-Li County (TW)

(72) Inventors: Yu-Hsiang Chiu, Miao-Li County (TW); Chien-Feng Shih, Miao-Li County (TW); Huan-Kuang Peng, Miao-Li County (TW)

(73) Assignee: INNOLUX CORPORATION, Miao-Li County (TW)

(*) Notice: Subject to any disclaimer, the term of this patent is extended or adjusted under 35 U.S.C. 154(b) by 25 days.

This patent is subject to a terminal disclaimer.

(21) Appl. No.: 15/707,453

(22) Filed: Sep. 18, 2017

(65) Prior Publication Data

US 2018/0004026 A1 Jan. 4, 2018

Related U.S. Application Data

(63) Continuation of application No. 14/932,253, filed on Nov. 4, 2015, now Pat. No. 9,798,170.

(30) Foreign Application Priority Data

Dec. 5, 2014 (TW) .............................. 103142303 A

(51) Int. Cl.
*G02F 1/133* (2006.01)
*G02F 1/1333* (2006.01)
*G02F 1/1345* (2006.01)

(52) U.S. Cl.
CPC ........ *G02F 1/13306* (2013.01); *G02F 1/1333* (2013.01); *G02F 1/13452* (2013.01);
(Continued)

(58) Field of Classification Search
None
See application file for complete search history.

(56) References Cited

U.S. PATENT DOCUMENTS

2002/0015127 A1 2/2002 Hagiwara
2003/0016315 A1 1/2003 Ueno
(Continued)

FOREIGN PATENT DOCUMENTS

JP 2009-122636 A 6/2009
JP 2010-020221 A 1/2010
KR 10-2011-0065823 A 6/2011

OTHER PUBLICATIONS

Chinese language office action dated Dec. 4, 2015, issued in application No. TW 103142303.
(Continued)

*Primary Examiner* — Ryan Crockett
(74) *Attorney, Agent, or Firm* — McClure, Qualey & Rodack, LLP

(57) ABSTRACT

A display panel includes a first substrate, a second substrate, a display layer, and a driving unit. The first substrate has a display area, an extended area, and an edge area located between the display area and the extended area. The display layer is positioned between the first and second substrates. The length of a boundary line of the edge area and the extended area is greater than the length of a bottom edge of the extended area that is away from the edge area.

20 Claims, 13 Drawing Sheets

(52) U.S. Cl.
CPC .............. *G02F 2001/13456* (2013.01); *G02F 2001/133388* (2013.01); *G02F 2201/56* (2013.01)

(56) References Cited

U.S. PATENT DOCUMENTS

| | | | |
|---|---|---|---|
| 2009/0059730 | A1 | 3/2009 | Lyons et al. |
| 2009/0102758 | A1* | 4/2009 | Anzai .................. G09G 3/3225 345/76 |
| 2009/0213534 | A1* | 8/2009 | Sakai .................. G02F 1/13452 361/679.21 |
| 2010/0141570 | A1 | 6/2010 | Horiuchi |
| 2015/0355487 | A1 | 12/2015 | Emmert |
| 2016/0066409 | A1* | 3/2016 | Kwon ..................... H05K 1/028 174/254 |
| 2016/0113106 | A1* | 4/2016 | Kim ....................... H05K 1/028 361/749 |
| 2016/0118370 | A1* | 4/2016 | Wu ....................... H01L 25/167 362/19 |
| 2016/0150663 | A1* | 5/2016 | Huang .................... G09G 3/20 345/206 |
| 2016/0170246 | A1* | 6/2016 | Lu .................... G02F 1/133512 349/42 |

OTHER PUBLICATIONS

Chinese language office action dated Dec. 5, 2017, issued in application No. CN 201410738185.6.

Japanese language office action dated Nov. 12, 2019, issued in application No. JP 2015-216250.

* cited by examiner

DISPLAY PANEL AND ELECTRONIC DISPLAY APPARATUS

CROSS REFERENCE TO RELATED APPLICATIONS

This application is a continuation of application Ser. No. 14/932,253, filed on Nov. 4, 2015, now U.S. Pat. No. 9,798,170, which claims the priority of Taiwan Patent Application No. 103142303, filed on Dec. 5, 2014, the disclosure of which is hereby incorporated by reference herein in its entirety.

BACKGROUND

Field of the Invention

The present invention relates to an electronic device and an element thereof, and more particularly to an electronic display module and a display panel thereof.

Description of the Related Art

An electronic display module is an optoelectronic device able to transfer electric signals into visible images so that human beings can see the information contained in the electronic signals. Recently, liquid-crystal displays, and organic electro luminescence displays have gained great in popularity.

Because of their slimness, low power consumption and low radiation, these image-display devices have been widely used in portable electronic devices such as desktop computers, notebook computers, personal digital assistants (PDAs), and mobile phones, and are even gradually replacing cathode ray tube (CRT) monitors and conventional TVs To satisfy the various requirements of portable electronic products, manufacturers have to concern themselves with the external appearance of the products, so as to install various elements within the limited internal space of the products. However, at present, such products have not been entirely satisfactory in all respects.

SUMMARY

One of the objectives of the disclosure is to provide a display panel which has a non-rectangular extended area allowing the mounting of a driving unit and a test pad.

In accordance with some embodiments of the disclosure, the display panel includes a first substrate, a second substrate, and a display layer. The first substrate has a display area, an extended area, and an edge area located between the display area and the extended area. The display layer is positioned between the first and second substrates. A boundary line is defined between the extended area and the edge area. The extended area has a bottom edge and at least two lateral edges positioned between the boundary line and the bottom edge. The length of the boundary line is greater than the length of the bottom edge.

In some embodiments, at least one of the lateral edges includes a curved line. A main axis passes through the center of the boundary line and the center of the bottom line, and the curved line is bent toward the main axis. In some embodiments, the lateral edge further includes a straight line, the straight line is positioned between the boundary line and the bottom edge, and the curved line connects the straight line to the boundary line.

In some embodiments, at least one of the lateral edges includes a curved line. A main axis passes through the center of the boundary line and the center of the bottom line, and the curved line is bent away from the main axis. In some embodiments, the display area has a substantially round shape, and the distance between the center of the display and the intersection of the boundary line and the curved line is shorter than the curvature radius of the curved line.

In some embodiments, at least one of the lateral edges is a straight line.

In some embodiments, a main axis passes through the center of the boundary line and the center of the bottom line, the distance between an intersection of one of the lateral edges and the boundary line is greater than the distance between the other intersection of the lateral edge and the bottom edge.

In some embodiments, the display area has a substantially round shape.

In some embodiments, the display panel further includes a driving unit connected to the extended area.

Another objective of the embodiment is to provide an electronic display apparatus. The electronic display apparatus includes a housing, a driving circuit assembly, and a display panel of any one of the aforementioned embodiments. The housing defines an accommodation space. The display panel is positioned in the accommodation space. A driving unit of the display panel is connected to the extended area or to the driving circuit assembly. In addition, a portion of the housing that corresponds to the extended area has a shape that conforms to the shape of the extended area.

BRIEF DESCRIPTION OF THE DRAWINGS

For a more complete understanding of the embodiments, and the advantages thereof, reference is now made to the following descriptions taken in conjunction with the accompanying drawings.

DETAILED DESCRIPTION OF THE ILLUSTRATIVE EMBODIMENTS

Figure 1:
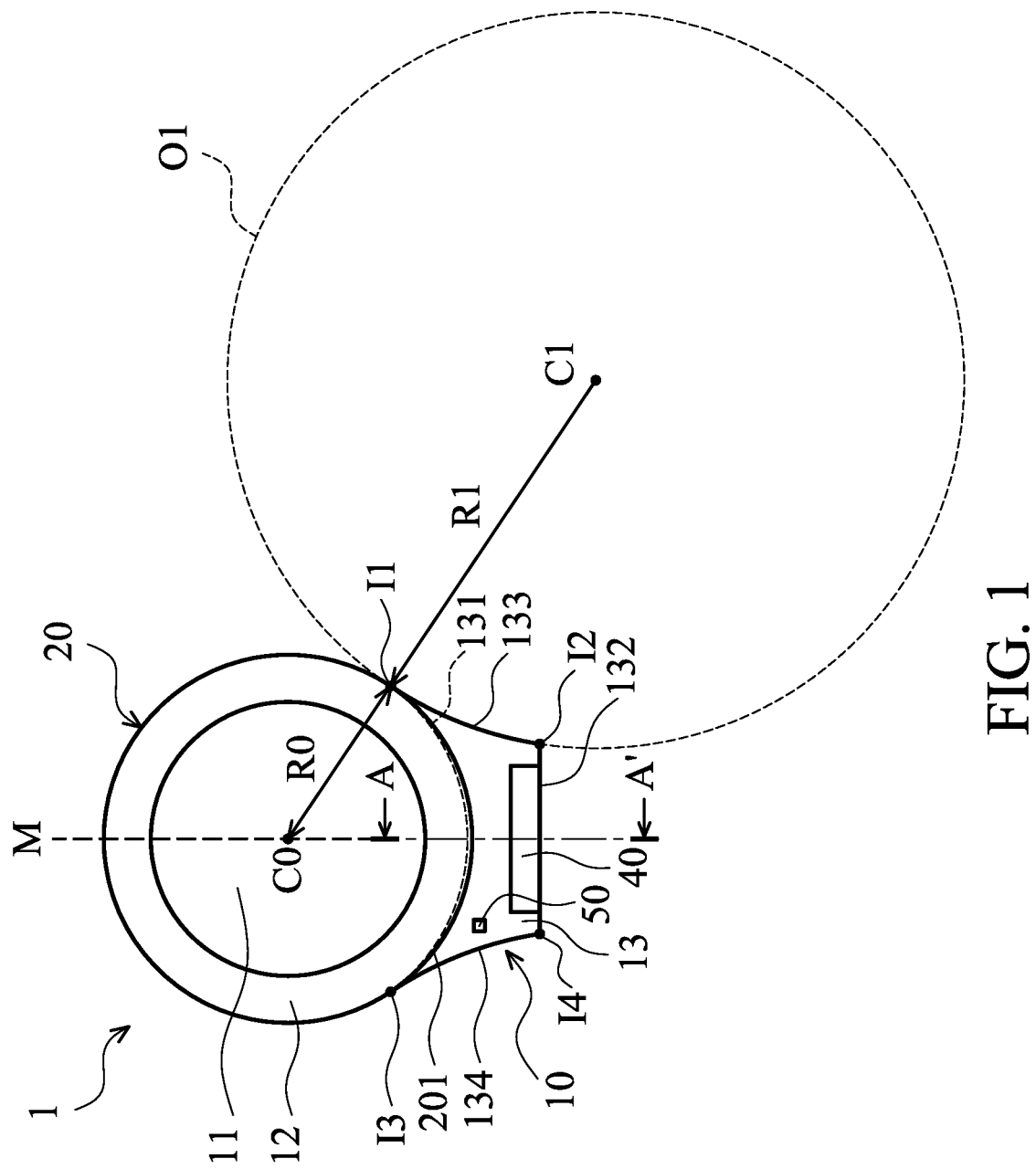
FIG. 1 shows a schematic view of a display panel, in accordance with some embodiments of the disclosure.

The electronic display device of the present disclosure is described in detail in the following description. In the following detailed description, for purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments. In addition, in this specification, expressions such as "first insulating bump disposed on/over a second material layer", may indicate not only the direct contact of the first insulating bump and the second material layer, but also, a non-contact state with one or more intermediate layers between the first insulating bump and the second material layer. In the above situation, the first insulating bump may not directly contact the second material layer.

It should be noted that the elements or devices in the drawings of the present disclosure may be present in any form or configuration known to those skilled in the art. In addition, the expression "a layer overlying another layer", "a layer is disposed above another layer", "a layer is disposed on another layer" and "a layer is disposed over another layer" may indicate not only that the layer directly contacts the other layer, but also that the layer does not directly contact the other layer, there being one or more intermediate layers disposed between the layer and the other layer.

In addition, in this specification, relative expressions are used. For example, "lower", "bottom", "higher" or "top" are used to describe the position of one element relative to another. It should be appreciated that if a device is flipped upside down, an element at a "lower" side will become an element at a "higher" side.

The terms "about" and "substantially" typically mean+/−20% of the stated value, more typically +/−10% of the stated value and even more typically +/−5% of the stated value. The stated value of the present disclosure is an approximate value. When there is no specific description, the stated value includes the meaning of "about" or "substantially".

Figure 2A:
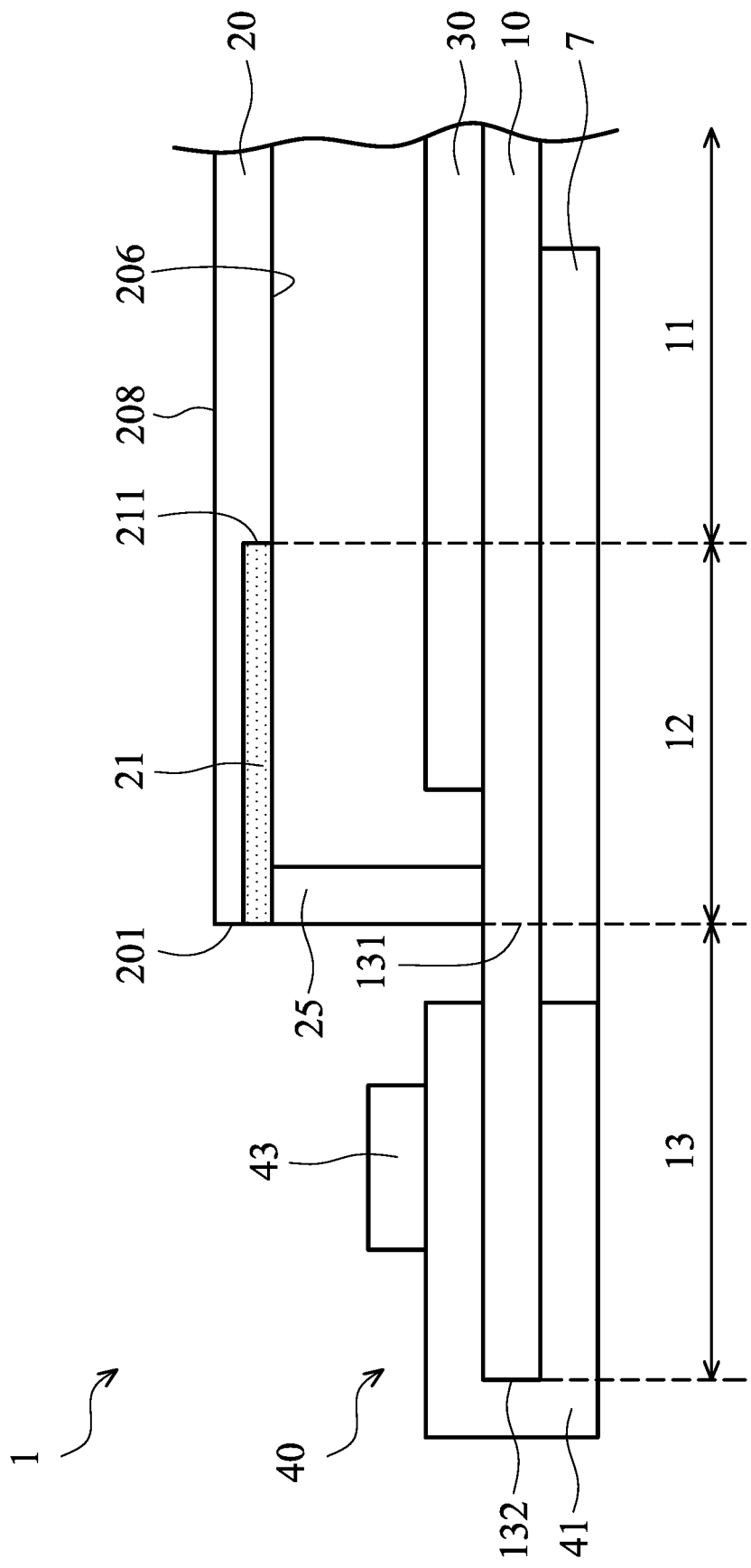
FIG. 2A shows a partial cross-sectional view taken along line A-A' of FIG. 1.
Figure 2B:
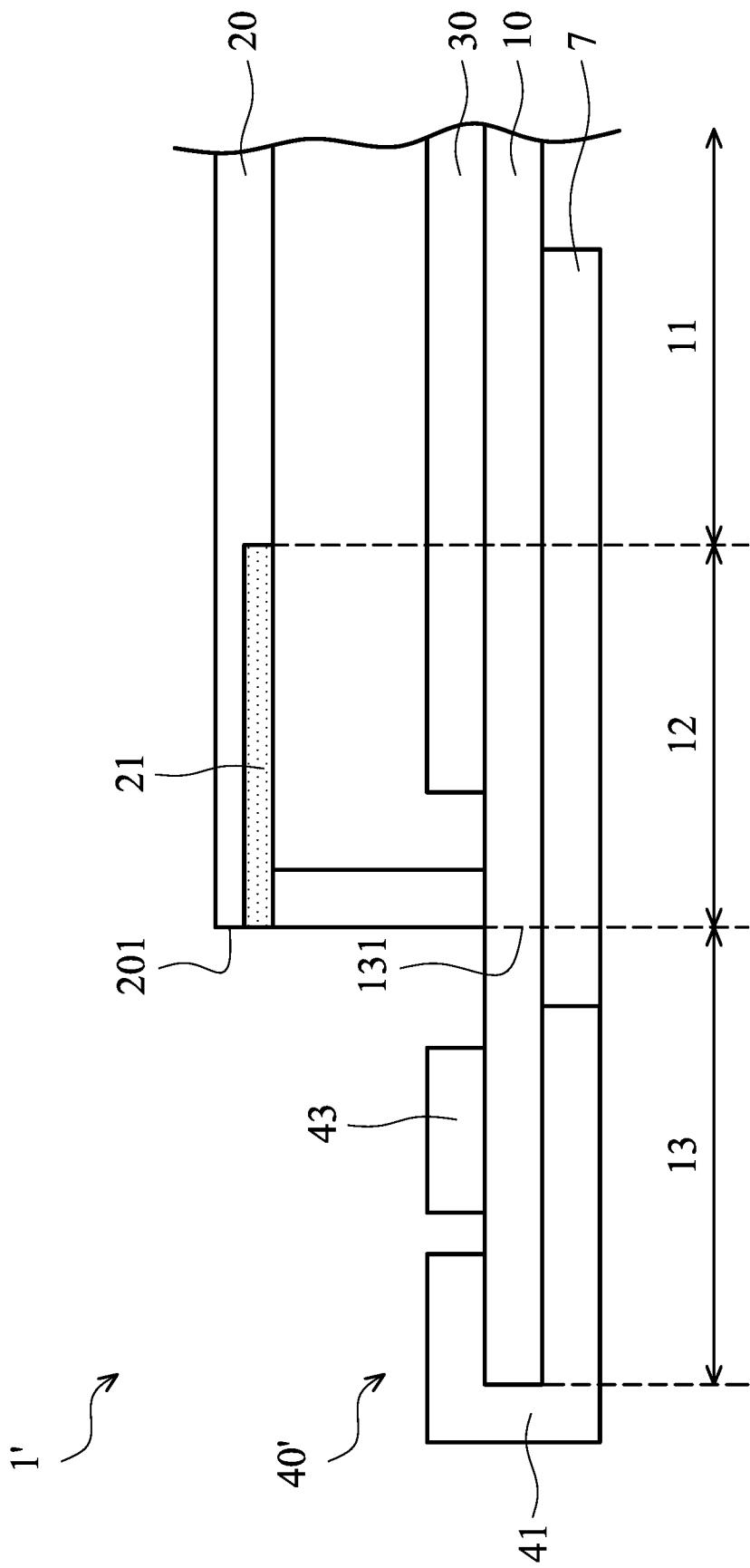
FIG. 2B shows a partial cross-sectional view taken along line A-A' of FIG. 1.

Please refer to FIG. 1 with reference to FIG. 2A and FIG. 2B, which respectively show cross-sectional views of two portions of the display panel 1 taken along line A-A' of FIG. 1. The display panel 1 includes a first substrate 10, a second substrate 20, a display layer 30 (FIG. 2), a driving unit 40, and one or more testing pads 50, in accordance with some embodiments. The elements of the display panel 1 can be added or omitted, and the disclosure should not be limited by the embodiment.

The display panel 1 may be a liquid-crystal panel, such as thin film transistor panel. Alternatively, the display panel 1 may be a twisted nematic (TN) mode liquid-crystal panel, a vertical aligned (VA) mode liquid-crystal panel, an in-plane switching (IPS) mode liquid-crystal panel, a fringe field switching (FFS) mode liquid-crystal panel, a cholesteric mode liquid-crystal panel, a blue phase in-plane switching (IPS) mode liquid-crystal panel, or another suitable liquid-crystal panel. The display panel 1 may be an organic light-emitting diode (OLED) panel.

In some embodiments, the second substrate 20 is spaced apart from the first substrate 10 by a distance and covers a partial area of the first substrate 10. For example, the first substrate 10 has a display area 11, an edge area 12, and an extended area 13. The second substrate 20 covers the display area 11 and the edge area 12 of the first substrate 10 and exposes the extended area 13. In addition, as shown in FIG. 2, the second substrate 20 is connected to the first substrate 10 via a sealing member 25, and the second substrate 20 is not directly connected to one the other. The first substrate 10 may be a thin film transistor (TFT) substrate and include a number of pixels and switching elements positioned on the display area 11 and the edge area 12. The other driving circuit is positioned on the extended area 13. The second substrate 20 may be a color filter substrate or a transparent cover substrate and have electrode patterns, block matrix, or color filter elements. The second substrate 20 may be equipped with touch functionality.

The display layer 30 is positioned between the first substrate 10 and the second substrate 20. The display layer 30 is operated according to electronic signals from the driving unit 40 so as to show images. The display layer 30 may include liquid crystal or OLED. The sealing member 25 may include sealant or frit surrounding the display layer 30 and may be configured to maintain the gap between the first substrate 10 and the second substrate 20.

Referring to FIG. 2A and FIG. 2B, in some embodiments, the display area 11 of the first substrate 10 is defined by the black matrix 21 formed on the second substrate 20. The black matrix 21 may be formed on the inner surface 206 or the outer surface 208 of the second substrate 20. The display area 11 is positioned at the area surrounded by the inner edge 211 of the black matrix 21. In some embodiments, as shown in FIG. 1, the display area 11 may have a substantially round shape with a center C0 defined at a substantial center (geometric center) of the display area 11. The edge area 12 completely surrounds the outer side of the display area 11. The driving circuits (such as partial elements of gate drives, partial elements of data driver, and conducting lines, not shown in figures) for driving the display layer 30 are formed on the edge area 12 of the first substrate 10.

The extended area 13 extends away from the edge area 12 in a direction away from the display area 11. In some embodiments, the display area 11, the edge area 12, and the extended area 13 are successively arranged along a main line M, and the edge area 12 is positioned between the display area 11 and the extended area 13. A boundary line 131 of the extended area 13 is defined by a projection line of the outer edge 201 of the second substrate 20 over the first substrate 10. In the embodiments shown in FIG. 1, the second substrate 20 has a round shape, and therefore the boundary line 131 defined by the outer edge 201 of the second substrate 20 is a curved line, and the boundary line has a curvature radius of R0.

It should be noted that, in the embodiments of FIG. 1 and the following embodiments, the boundary line 131 between the extended area 13 and the edge area 12 is indicated by a dotted line and is intentionally drawn separated from the outer edge 201 of the second substrate 20 for clarity.

Referring to FIG. 1, the extended area 13 has a bottom edge 132. The bottom edge 132 is located on the side of the extended area 13 which is away from the edge area 12 and is opposite from the boundary line 131. In some embodiments, the bottom edge 132 is a straight line that is perpendicular to the main axis M passing through the center C0 of the display area 11 for facilitating the assembly of the driving unit 40. The driving unit 40 includes a driving chip 43, a circuit board 41, and a driving circuit board assembly 7. The driving chip 43 may be directly connected to the driving circuit on the extended area 13 or connected to the circuit board 41. The driving chip 43 is connected to the driving circuit board assembly 7 via the circuit board 41. The circuit board 41 may be a flexible printed circuit (FPC) or a chip on film (COF) package. The driving circuit board assembly 7 may be a printed circuit board assembly (PCBA), which includes multiple active elements or passive elements.

The extended area 13 further includes two lateral edges 133 and 134 respectively connected between two ends of the boundary line 131 and the two ends of the bottom edge 132. In some embodiments, each of the two lateral edges 133 and 134 is a curved line and bent toward the main axis M. The curvature radius of the two lateral edges 133 and 134 may be any preset value. In some embodiments, the curvature radius of the two lateral edges 133 and 134 is greater than or equal to 3 mm so as to facilitate the manufacturing of the first substrate 10. For example, in the embodiments shown in FIG. 1, the curvature center of the lateral edge 133 and the lateral edge 133 itself are located on the same sides of the main axis M, and the lateral edge 133 has a curvature radius of R1. The curvature radius R1 may be greater than or equal to 3 mm. The curvature radius of the lateral edge 133 may be the same or different from that of the lateral edge 134. In some embodiments, the extended area 13 is symmetric to the main axis M, and the main axis M passes through the center of the boundary line 131 and the center of the bottom edge 132.

The distance between the main axis M and an intersection I1 of the lateral edge 133 and the boundary line 131 is greater than the distance between the main axis M and an intersection I2 of the lateral edge 133 and the bottom edge 132. The distance between the main axis M and an intersection I3 of the lateral edge 134 and the boundary line 131 is greater than the distance between the main axis M and an intersection I4 of the lateral edge 134 and the bottom edge 132. In addition, along two opposite directions away from the main axis M, the distance between the boundary line 131 and the bottom edge 132 increases gradually, and is not a fixed value.

Figure 3:
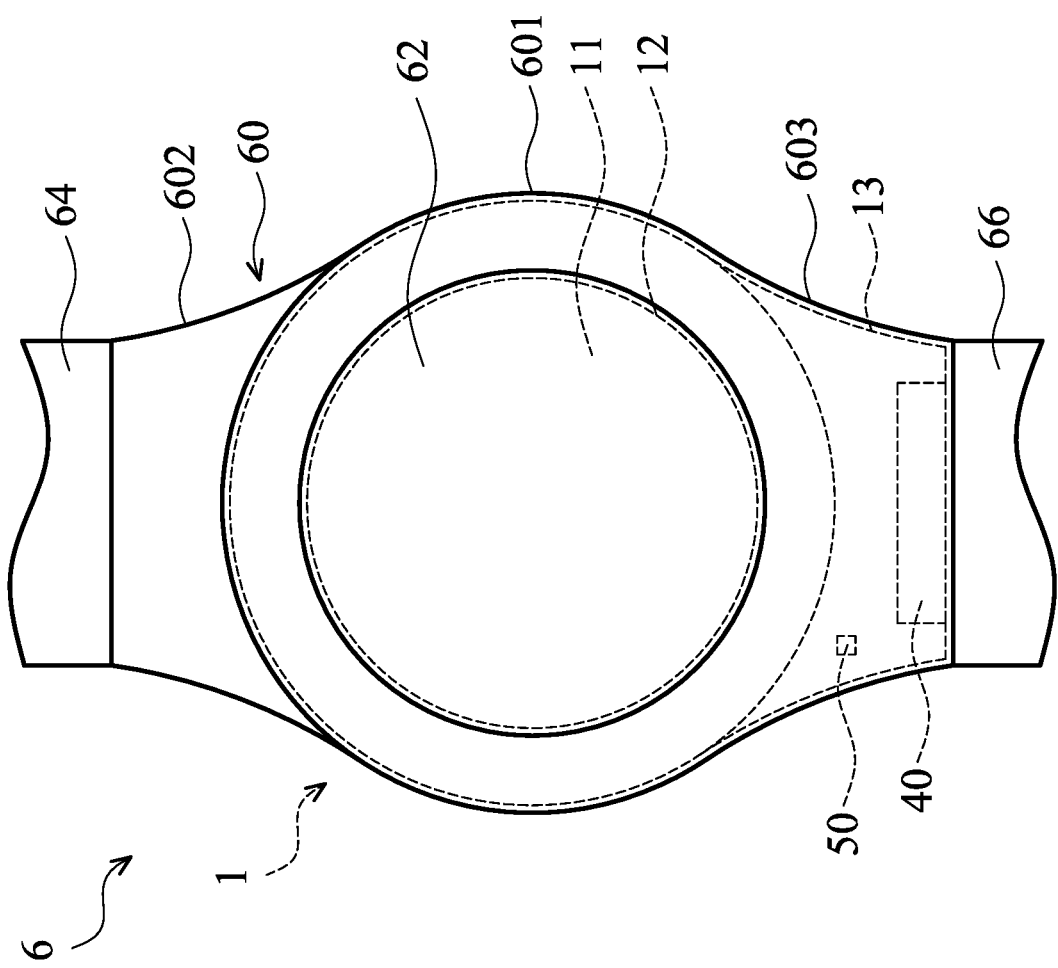
FIG. 3 shows a schematic view of an electronic display apparatus, in accordance with some embodiments of the disclosure.

FIG. 3 shows a schematic view illustrating the display panel 1 applied to an electronic display apparatus 6. In some embodiments, the electronic display apparatus 6 includes a housing 60 and a display panel 1 disposed in the housing 60. The housing 60 has a central segment 601, a top segment 602, and a bottom segment 603. The top segment 602 and the bottom segment 603 are respectively positioned at the top and bottom sides of the central segment 601 and connected to the straps. A transparent display window 62 is formed on the central segment 601 to enable the viewer to see the image displayed by the display panel 1. The display panel 1 is disposed in a space defined by the housing 60. The display area 11 directly faces the transparent display window 62. Both the display area 11 and the transparent display window 62 have a round shape and a similar radius. The extended area 13 is disposed in the bottom segment 603 and has a shape that conforms to the shape of the bottom segment 603.

Since the extended area 13 is not positioned below the transparent display window 62, the entire area of the transparent display window 62 can be utilized to display images from the display area 11. In addition, because there is enough space for receiving the extended area 13 in the bottom segment 603, the area of the extended area 13 can be enlarged. As a result, more testing pads 50 are allowed to be mounted on the extended area 13 to enable the display panel 1 to be tested. Moreover, the area of every single testing pad 50 can also be increased, and the cost of manufacturing is reduced.

The features of the extended area of the display panel 1 can be modified according to the appearance of an end product using the same. Multiple embodiments showing different exemplary display panels 1 are provided in the following descriptions.

Figure 4:
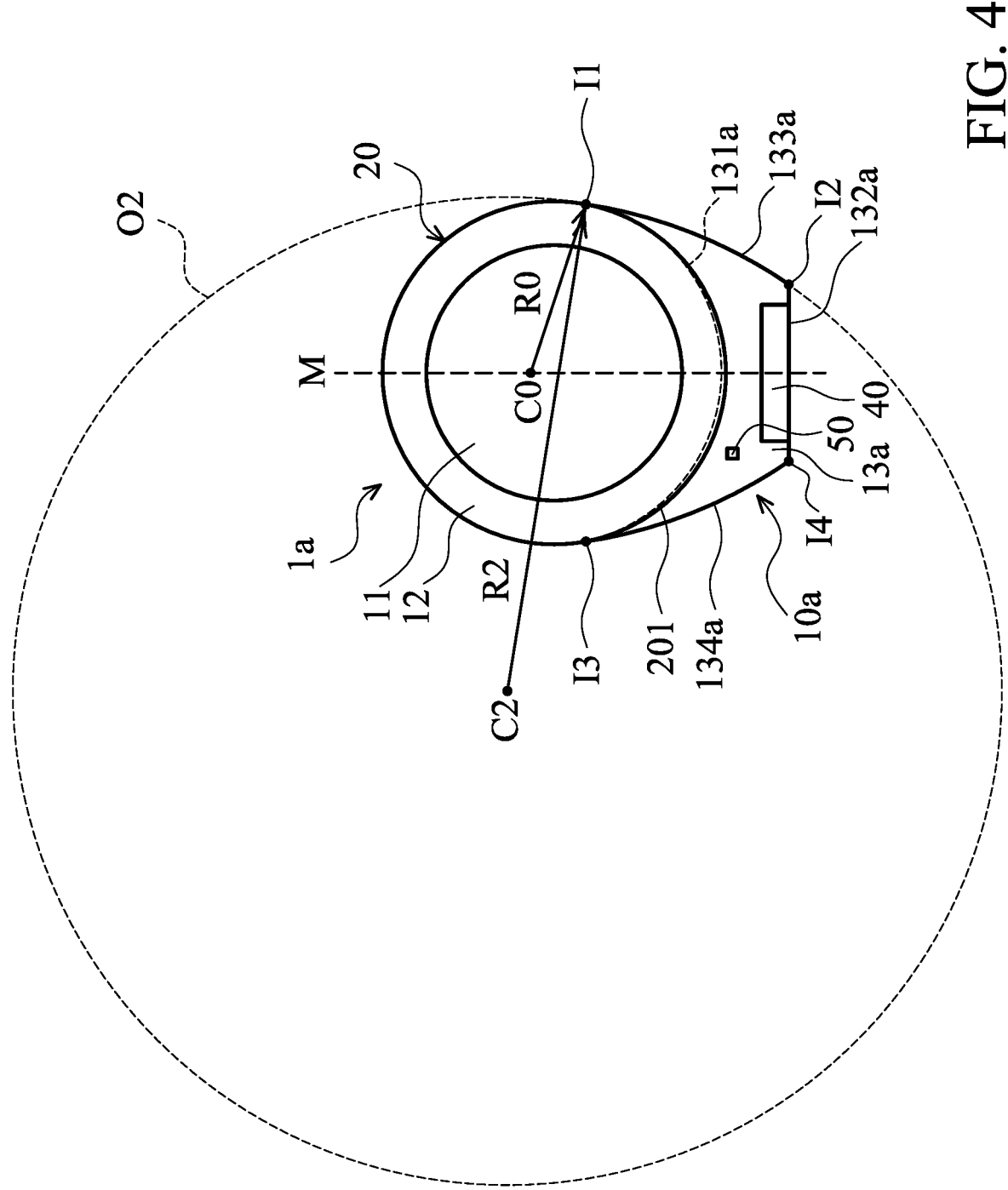
FIG. 4 shows a schematic view of a display panel, in accordance with some embodiments of the disclosure.

Referring to FIG. 4, in some embodiments, the extended area 13a extends away from the edge area 12 in a direction away from the display area 11. The display area 11, the edge area 12, and the extended area 13a are successively arranged along a main line M, and the edge area 12 is positioned between the display area 11 and the extended area 13a. The boundary line 131a of the extended area 13a and the edge area 12 is defined by a projection line of the outer edge 201 of the second substrate 20 over the first substrate 10a. In the embodiments shown in FIG. 4, the boundary line 131a is a curved line with a curvature radius of R0.

The extended area 13a has a bottom edge 132a. The bottom edge 132a is located on the side of the extended area 13a which is away from the edge area 12 and is opposite from the boundary line 131a. In some embodiments, the bottom edge 132a is a straight line that is perpendicular to the main axis M passing through the center C0 of the display area 11.

The extended area 13a includes two lateral edges 133a and 134a respectively connected between two ends of the boundary line 131a and the two ends of the bottom edge 132a. In some embodiments, each of the two lateral edges 133a and 134a is a curved line and is bent away from the main axis M. The curvature radius of each lateral edge 133a and 134a is greater than the radius R0 of the second substrate 20 for facilitating the manufacturing of the first substrate 10a. For example, the curvature center C2 of the lateral edge 133a and the lateral edge 133a itself are located on the two opposite sides of the main axis M, and the lateral edge 133a has a curvature radius of R2. The curvature radius R2 is greater than radius R0 of the second substrate 20 (i.e., distance between the center C0 of the display area 11 and an intersection I1 of the boundary line 131a and the lateral edge 133a). The curvature radius of the lateral edge 133a may be the same or different from that of the lateral edge 134a. In some embodiments, the extended area 13a is symmetric to the main axis M, and the main axis M passes through the center of the boundary line and the center of the bottom edge 13a.

The distance between the main axis M and an intersection I1 of the lateral edge 133a and the boundary line 131a is greater than the distance between the main axis M and an intersection I2 of the lateral edge 133a and the bottom edge 132a. The distance between the main axis M and an intersection I3 of the lateral edge 134a and the boundary line 131a is greater than the distance between the main axis M and an intersection I4 of the lateral edge 134a and the bottom edge 132a. The distance from the intersection I1 to the intersection I3 along the boundary line 131a is greater than the distance from the intersection I2 to the intersection I4 along the bottom edge 132a. In addition, along two opposite directions away from the main axis M, the distance between the boundary line 131a and the bottom edge 132a increases gradually, and is not a fixed value.

Figure 5:
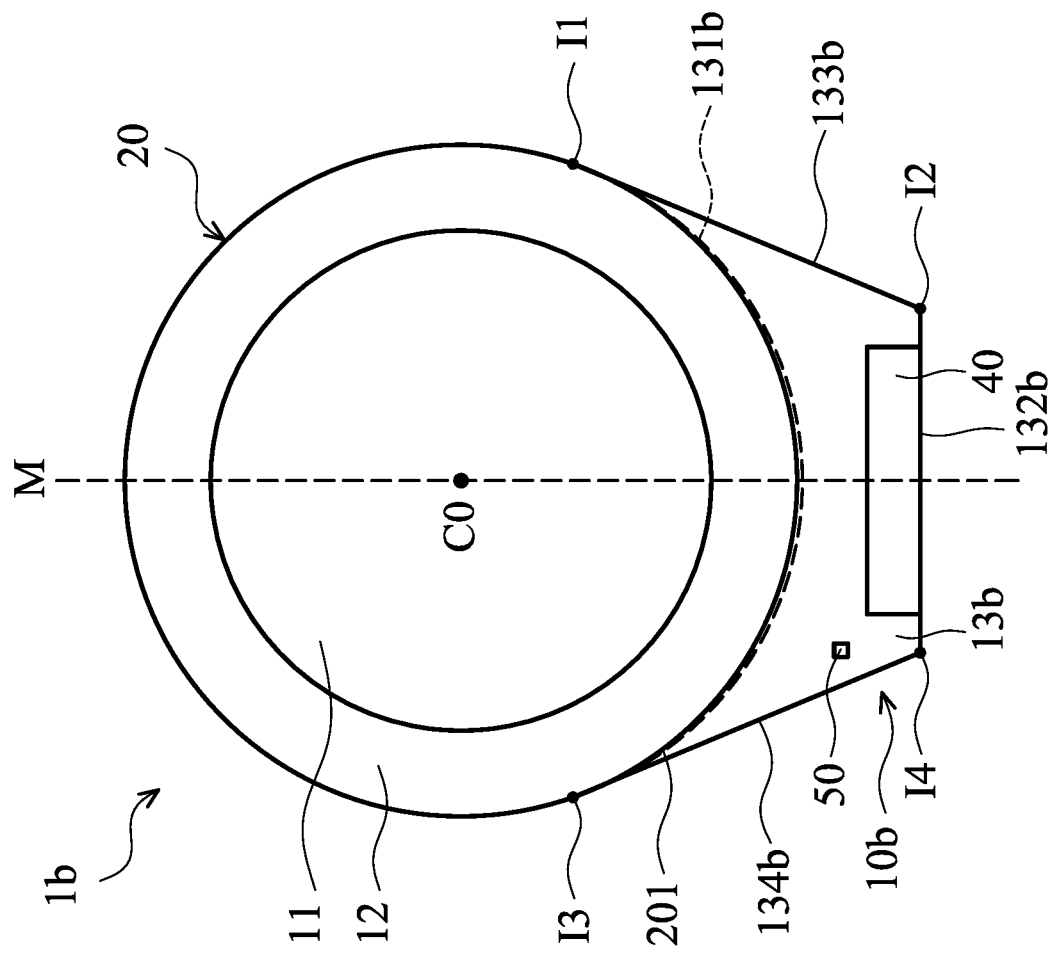
FIG. 5 shows a schematic view of a display panel, in accordance with some embodiments of the disclosure.

Referring to FIG. 5, the extended area 13*b* extends away from the edge area 12 in a direction away from the display area 11. The display area 11, the edge area 12, and the extended area 13*b* are successively arranged along a main line M, and the edge area 12 is positioned between the display area 11 and the extended area 13*b*. A boundary line 131*b* of the extended area 13*b* and the edge area 12 is defined by a projection line of the outer edge 201 of the second substrate 20 over the first substrate 10. In the embodiments shown in FIG. 5, the boundary line 131*b* is a curved line with a curvature radius of R0.

The extended area 13*b* has a bottom edge 132*b*. The bottom edge 132*b* is located on the side of the extended area 13*b* which is away from the edge area 12 and is opposite from the boundary line 131*b*. In some embodiments, the bottom edge 132*b* is a straight line that is perpendicular to the main axis M passing the center C0 of the display area 11. The extended area 13*b* further includes two lateral edges 133*b* and 134*b* respectively connected between two ends of the boundary line 131*b* and the two ends of the bottom edge 132*b*. Each of the two lateral edges 133*b* and 134*b* is a straight line. The length of the lateral edge 133*b* may be the same or different from that of the lateral edge 134*b*. In some embodiments, the extended area 13*b* is symmetric to the main axis M, and the main axis M passes through the center of the boundary line and the center of the bottom edge 13*b*.

The distance between the main axis M and an intersection I1 of the lateral edge 133*b* and the boundary line 131*b* is greater than the distance between the main axis M and an intersection I2 of the lateral edge 133*b* and the bottom edge 132*b*. The distance between the main axis M and an intersection I3 of the lateral edge 134*b* and the boundary line 131*b* is greater than the distance between the main axis M and an intersection I4 of the lateral edge 134*b* and the bottom edge 132*b*. The distance from the intersection I1 to the intersection I3 along the boundary line 131*b* is greater than the distance from the intersection I2 to the intersection I4 along the bottom edge 132*b*. In addition, along two opposite directions away from the main axis M, the distance between the boundary line 131*b* and the bottom edge 132*b* increases gradually, and is not a fixed value.

Figure 6:
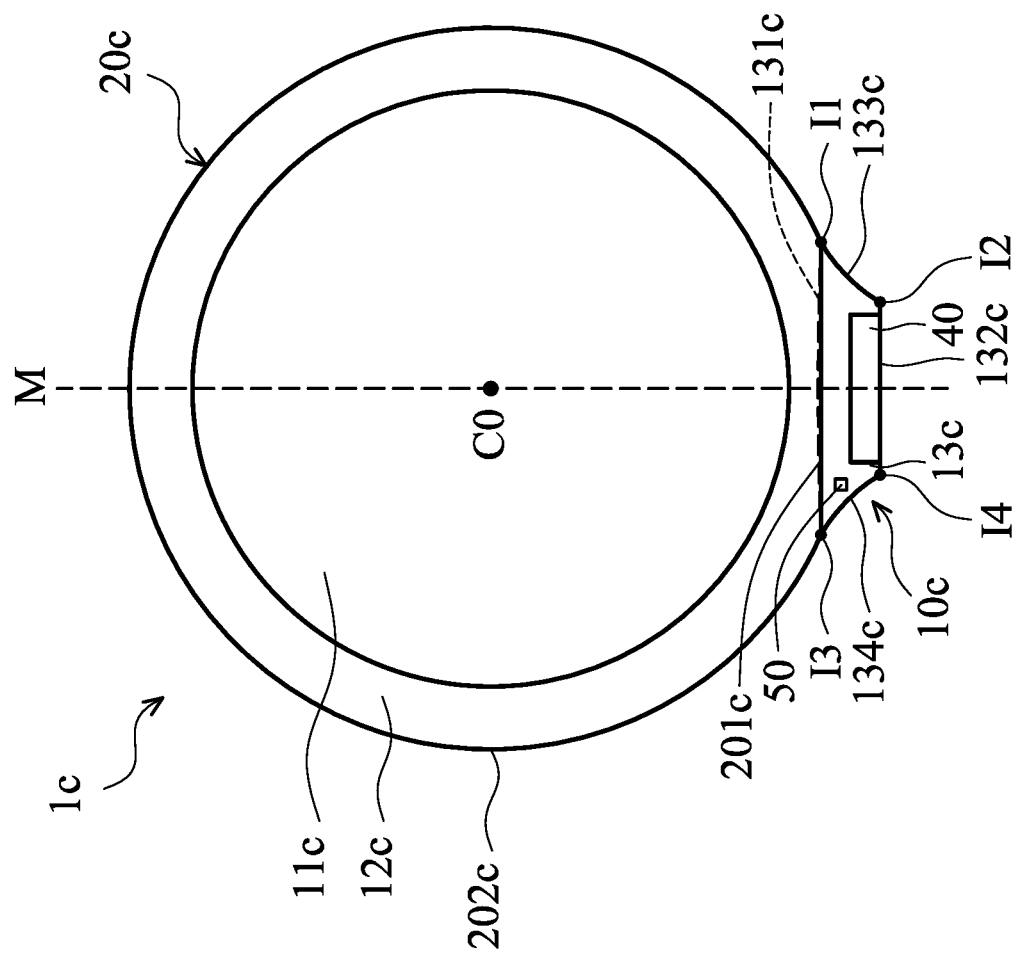
FIG. 6 shows a schematic view of a display panel, in accordance with some embodiments of the disclosure.

Referring to FIG. 6, in according to some embodiments of the disclosure, the display panel 1 includes a first substrate 10*c*, a second substrate 20*c*, a display layer (not shown in FIG. 6), a driving unit 40, and one or more testing pad 50, in accordance with some embodiments. The elements of the display panel 1 can be added or omitted, and the disclosure should not be limited by the embodiments. The second substrate 20*c* is spaced from the first substrate 10*c* by a distance and covers a partial area of the first substrate 10*c*. For example, the first substrate 10*c* has a display area 11*c*, an edge area 12*c*, and an extended area 13*c*. The second substrate 20*c* covers the display area 11*c* and the edge area 12*c* of the first substrate 10*c* and exposes the extended area 13*c*.

In some embodiments, the display area 11*c* may have a substantially round shape with a center C0 defined at a substantial center of the display area 11*c*. In addition, the edge area 12*c* completely surrounds the outer side of the display area 11*c*. The driving circuits (such as partial elements of gate drives, partial elements of a data driver, and conducting lines, not shown in figures) for driving the display layer 30 are formed on the edge area 12*c* of the first substrate 10*c*.

The extended area 13*c* extends away from the edge area 12*c* in a direction away from the display area 11*c*. The display area 11*c*, the edge area 12*c*, and the extended area 13*c* are successively arranged along a main line M, and the edge area 12*c* is positioned between the display area 11*c* and the extended area 13*c*. A boundary line 131*c* of the extended area 13*c* and the edge area 12*c* is defined by a projection line of the outer edge 201*c* of the second substrate 20*c* over the first substrate 10*c*. For example, in the embodiments shown in FIG. 6, the second substrate 20*c* has a first outer edge 201*c* and a second outer edge 202*c*. The first outer edge 201*c* is a straight line, and the second outer edge 202*c* is a curved line with a center at the center of the circle C0 and connects to two ends of the first outer edge 201*c*. The boundary line 131*c* is defined by the first outer edge 201*c*, and therefore the boundary line 131*c* is a straight line.

The extended area 13*c* has a bottom edge 132*c*. The bottom edge 132*c* is located on the side of the extended area 13*c* which is away from the edge area 12*c* and is opposite from the boundary line 131*c*. In some embodiments, the bottom edge 132*c* is a straight line that is perpendicular to the main axis M passing the center C0 of the display area 11*c*.

In some embodiments, the extended area 13*c* further includes two lateral edges 133*c* and 134*c* respectively connected between two ends of the boundary line 131*c* and the two ends of the bottom edge 132*c*. Each of the two lateral edges 133*c* and 134*c* is a curved line bent toward the main axis M. The curvature radius of the two lateral edges 133*c* and 134*c* may be any value. In some embodiments, the curvature radius of the two lateral edges 133*c* and 134*c* is greater than or equal to 3 mm so as to facilitate the manufacturing of the first substrate 10*c*. The curvature radius of the lateral edge 133*c* may be the same or different from that of the lateral edge 134*c*. In some embodiments, the extended area 13*c* is symmetric to the main axis M, and the main axis M passes through the center of the boundary line 131*c* and the center of the bottom edge 132*c*.

The distance between the main axis M and an intersection I1 of the lateral edge 133*c* and the boundary line 131*c* is greater than the distance between the main axis M and an intersection I2 of the lateral edge 133*c* and the bottom edge 132*c*. The distance between the main axis M and an intersection I3 of the lateral edge 134*c* and the boundary line 131*c* is greater than the distance between the main axis M and an intersection I4 of the lateral edge 134*c* and the bottom edge 132*c*. The distance from the intersection I1 to the intersection I3 along the boundary line 131*c* is greater than the distance from the intersection I2 to the intersection I4 along the bottom edge 132*c*.

Compared with the embodiments shown in FIG. 1, with a given area of the display area 11*c*, the extended area 13*c* is closer to the center C0 of the display area 11*c* than the extended area 13*c*. Therefore, the length of the display panel 1*c* along the main axis M is smaller than the length of the display panel 1 along the main axis. Therefore, the size of an end product using the display panel 1*c* can be decreased.

Figure 7B:
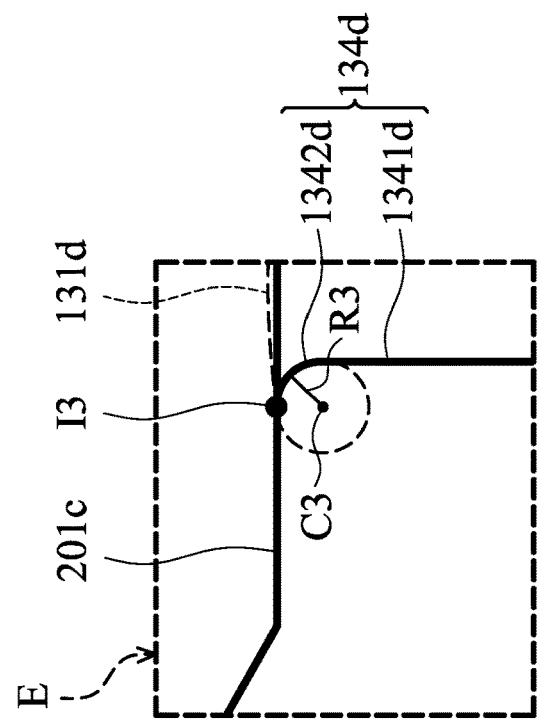
FIG. 7B shows an enlarged view of a region E in FIG. 7A.
Figure 7A:
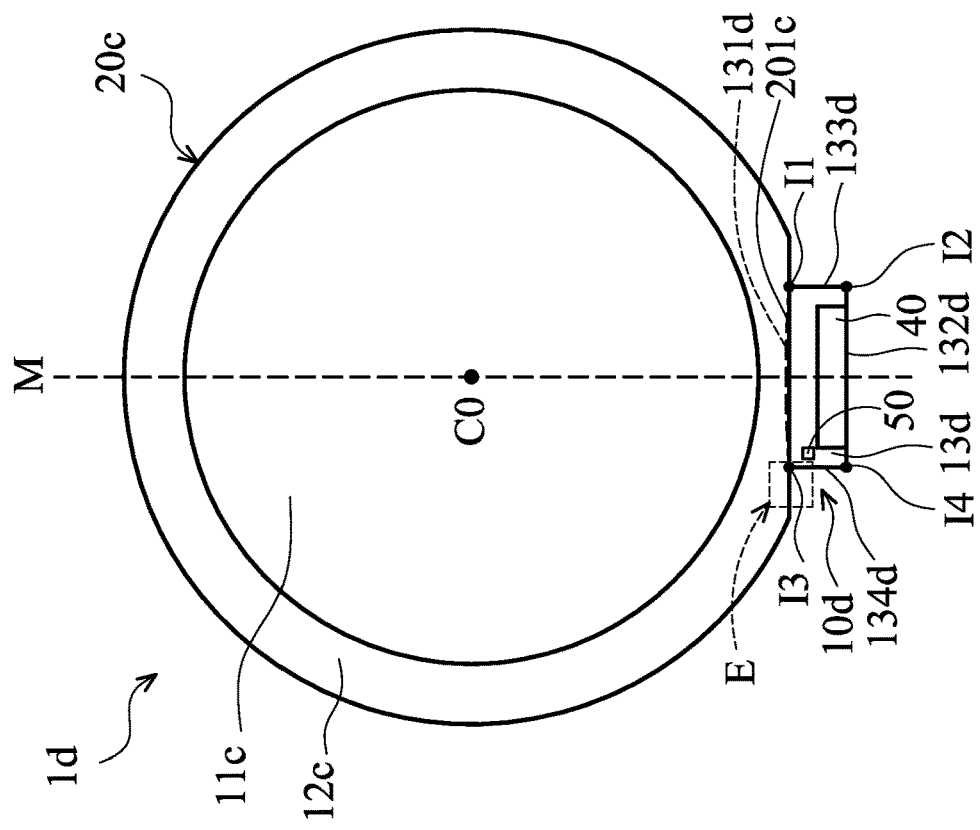
FIG. 7A shows a schematic view of a display panel, in accordance with some embodiments of the disclosure.

Referring to FIG. 7A and FIG. 7B, FIG. 7B shows an enlarged view of an E region of FIG. 7A. In some embodiments, the extended area 13*d* extends away from the edge area 12*c* in a direction away from the display area 11*c*. The display area 11*c*, the edge area 12*c*, and the extended area 13*d* are successively arranged along a main line M. A boundary line 131*d* of the extended area 13*d* and the edge area 12*c* is defined by a projection line of the outer edge 201*c* of the second substrate 20*c* over the first substrate 10*d*. As a result, the boundary line 131*d* is a straight line. In the embodiments shown in FIG. 7A, the length of the boundary line 131*d* is shorter than the length of the first outer edge 201*c*.

The extended area 13d has a bottom edge 132d. The bottom edge 132d is located on the side of the extended area 13d which is away from the edge area 12c and is opposite from the boundary line 131d. In some embodiments, the bottom edge 132d is a straight line that is perpendicular to the main axis M passing through the center C0 of the display area 11cc.

The extended area 13d further includes two lateral edges 133d and 134d respectively connected between two ends of the boundary line 131d and the two ends of the bottom edge 132d. In some embodiments, as shown in FIG. 7B, the lateral edge 134d includes a first segment 1341d and a second segment 1342d. The first segment 1341d is a straight line perpendicularly connected to the bottom edge 132d. The second segment 1342d is a curved line connecting the first segment 1341d to the boundary line 131d. The second segment 1342d is bent toward the main axis M. The curvature radius of the second segment 1342d may be any preset value. In some embodiments, the curvature radius of the second segment 1342d is greater than or equal to 3 mm so as to facilitate the manufacturing of the first substrate 10d. For example, the curvature center C3 of the second segment 1342d and the lateral edge 133d itself are located on the same side of the main axis M, and the lateral edge 133d has a curvature radius of R3. The curvature radius of R3 is greater than or equal to 3 mm. The configuration of the lateral edge 133d may be the same or different from that of the lateral edge 134d. In some embodiments, the extended area 13d is symmetric to the main axis M, and the main axis M passes through the center of the boundary line and the center of the bottom edge 13d.

The distance between the main axis M and an intersection I1 of the lateral edge 133d and the boundary line 131d is greater than the distance between the main axis M and an intersection I2 of the lateral edge 133d and the bottom edge 132d. The distance between the main axis M and an intersection I3 of the lateral edge 134d and the boundary line 131d is greater than the distance between the main axis M and an intersection I4 of the lateral edge 134d and the bottom edge 132d. The distance from the intersection I1 to the intersection I3 along the boundary line 131d is greater than the distance from the intersection I2 to the intersection I4 along the bottom edge 132d.

Figure 8:
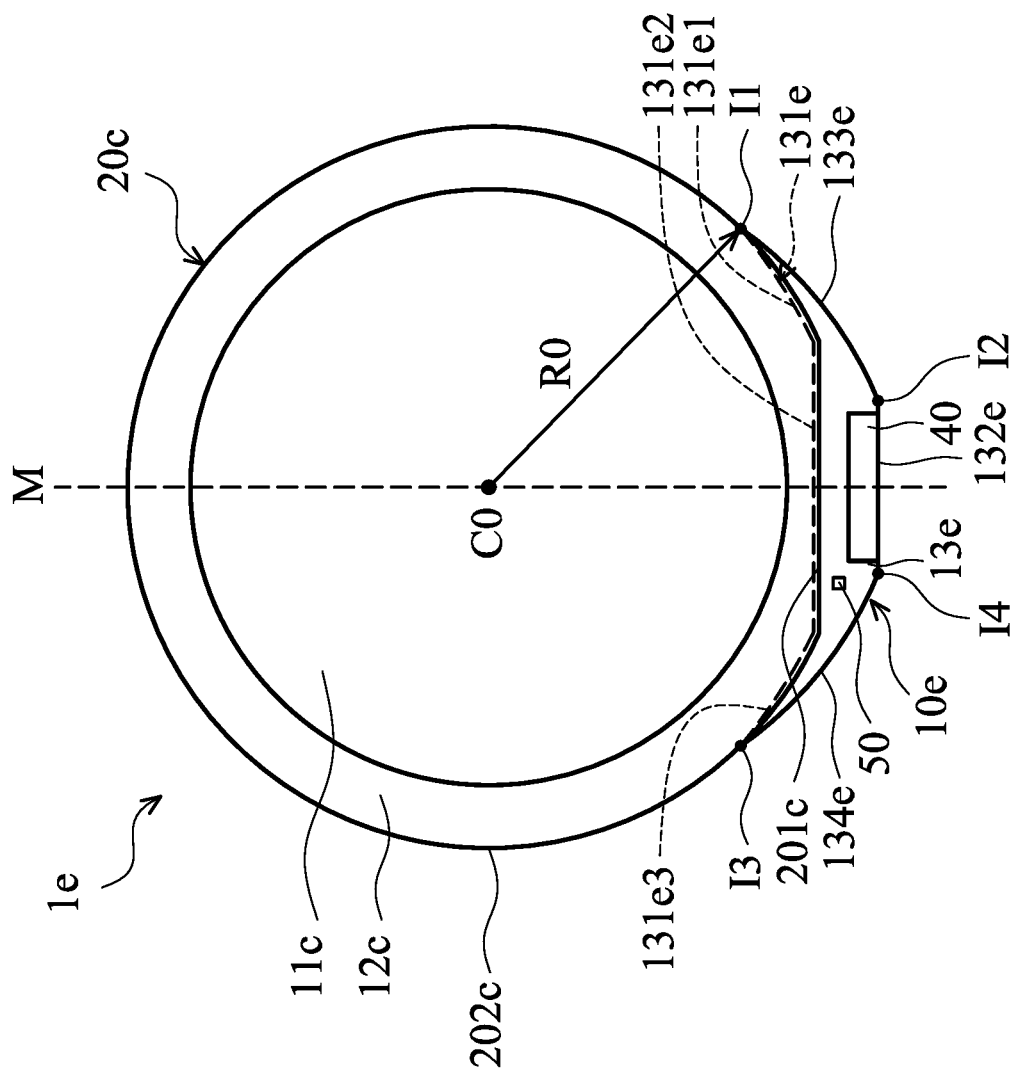
FIG. 8 shows a schematic view of a display panel, in accordance with some embodiments of the disclosure.

Referring to FIG. 8, in some embodiments, the extended area 13e extends away from the edge area 12c in a direction away from the display area 11c. The display area 11c, the edge area 12c, and the extended area 13e are successively arranged along a main line M. A boundary line 131e of the extended area 13e and the edge area 12c is defined by a projection line of the outer edge 201c and 202C of the second substrate 20c over the first substrate 10e.

In the embodiments of FIG. 8, the boundary line 131e includes a first segment 131e1, a second segment 131e2, and a third segment 131e3 sequentially connected. The second segment 131e2 is a straight line aligned with the first outer edge 201c of the second substrate 20c. The second segment 131e2 is perpendicular to the main axis M passing the center C0 of the display area 11c. Each of the first segment 131e1 and the third segment 131e3 is defined by a portion of the second outer edge 202c of the second substrate 20c. As a result, the first segment 131e1 and the third segment 131e3 are curved lines. The first segment 131e1 and the third segment 131e3 are respectively connected to two sides of the second segment 131e2 and have radius curvatures of R0.

The extended area 13e has a bottom edge 132e. The bottom edge 132e is located on the side of the extended area 13e which is away from the edge area 12c and is opposite from the boundary line 131e. In some embodiments, the bottom edge 132e is a straight line that is perpendicular to the main axis M passing through the center C0 of the display area 11c.

The extended area 13e further includes two lateral edges 133e and 134e respectively connected between two ends of the boundary line 131e and the two ends of the bottom edge 132e. In some embodiments, each of the two lateral edges 133e and 134e is a curved line and is bent away from the main axis M. The curvature radius of each lateral edge 133e and 134e is greater than the radius R0 of the second substrate 20c for facilitating the manufacturing of the first substrate 10e. The curvature radius of the lateral edge 133e may be the same or different from that of the lateral edge 134e. In some embodiments, the extended area 13e is symmetric to the main axis M, and the main axis M passes through the center of the boundary line 131e and the center of the bottom edge 132e.

The distance between the main axis M and an intersection I1 of the lateral edge 133e and the boundary line 131e is greater than the distance between the main axis M and an intersection I2 of the lateral edge 133e and the bottom edge 132e. The distance between the main axis M and an intersection I3 of the lateral edge 134e and the boundary line 131e is greater than the distance between the main axis M and an intersection I4 of the lateral edge 134e and the bottom edge 132e. The distance from the intersection I1 to the intersection I3 along the boundary line 131e is greater than the distance from the intersection I2 to the intersection I4 along the bottom edge 132e. In addition, along two opposite directions away from the main axis M, the distance between the boundary line 131e and the bottom edge 132e increases gradually, and is not a fixed value.

Figure 9:
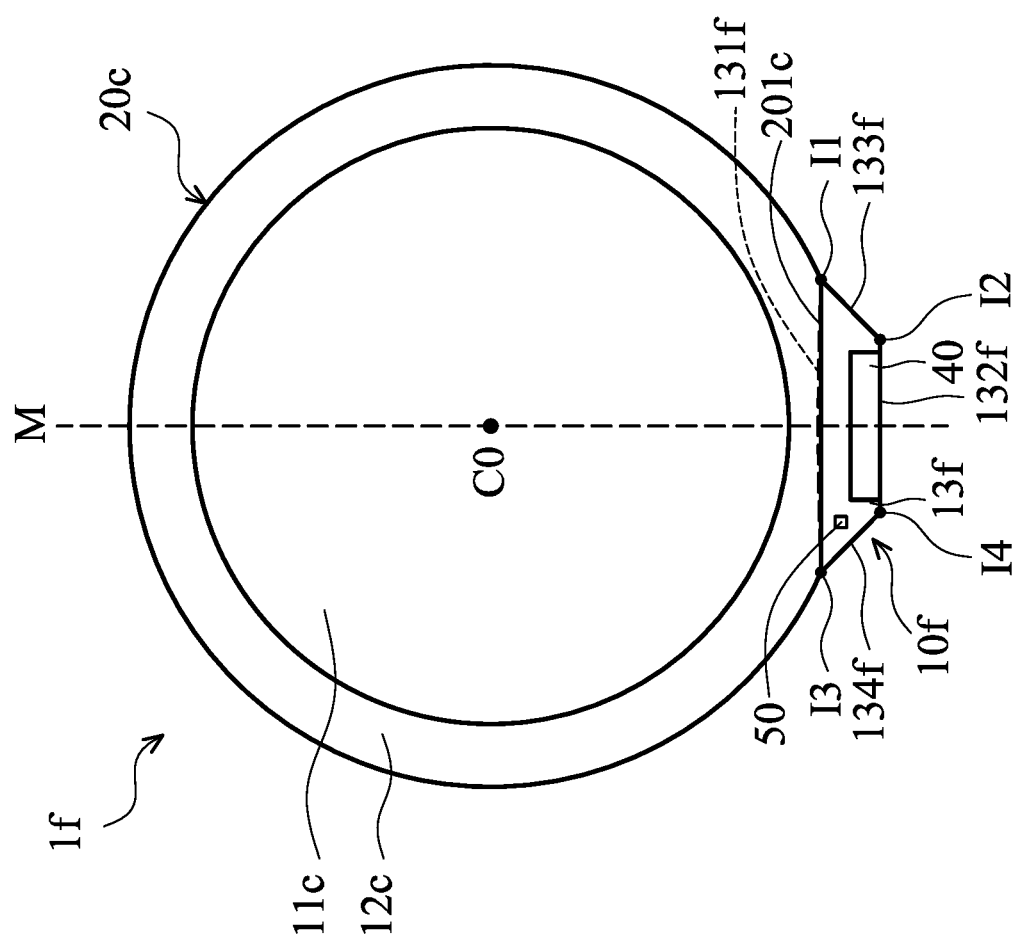
FIG. 9 shows a schematic view of a display panel, in accordance with some embodiments of the disclosure.

Referring to FIG. 9, the extended area 13f extends away from the edge area 12c in a direction away from the display area 11c. The display area 11c, the edge area 12c, and the extended area 13f are successively arranged along a main line M, and the edge area 12c is positioned between the display area 11c and the extended area 13f. A boundary line 131f of the extended area 13f and the edge area 12c is defined by a projection line of the outer edge 201c of the second substrate 20c over the first substrate 10f. As a result, the boundary line 131f is a straight line.

The extended area 13f has a bottom edge 132f. The bottom edge 132f is located on the side of the extended area 13f which is away from the edge area 12c and is opposite from the boundary line 131f. In some embodiments, the bottom edge 132f is a straight line that is perpendicular to the main axis M passing the center C0 of the display area 11c. The extended area 13f further includes two lateral edges 133f and 134f respectively connected between two ends of the boundary line 131f and the two ends of the bottom edge 132f. Each of the two lateral edges 133f and 134f is a straight line. The length of the lateral edge 133f may be the same or different from that of the lateral edge 134f. In some embodiments, the extended area 13f is symmetric to the main axis M, and the main axis M passes through the center of the boundary line and the center of the bottom edge 13f.

The distance between the main axis M and an intersection I1 of the lateral edge 133f and the boundary line 131f is greater than the distance between the main axis M and an intersection I2 of the lateral edge 133f and the bottom edge 132f. The distance between the main axis M and an intersection I3 of the lateral edge 134f and the boundary line 131f is greater than the distance between the main axis M and an intersection I4 of the lateral edge 134f and the bottom edge 132f. The distance from the intersection I1 to the intersection I3 along the boundary line 131*f* is greater than the distance from the intersection I2 to the intersection I4 along the bottom edge 132*f*.

Figure 10:
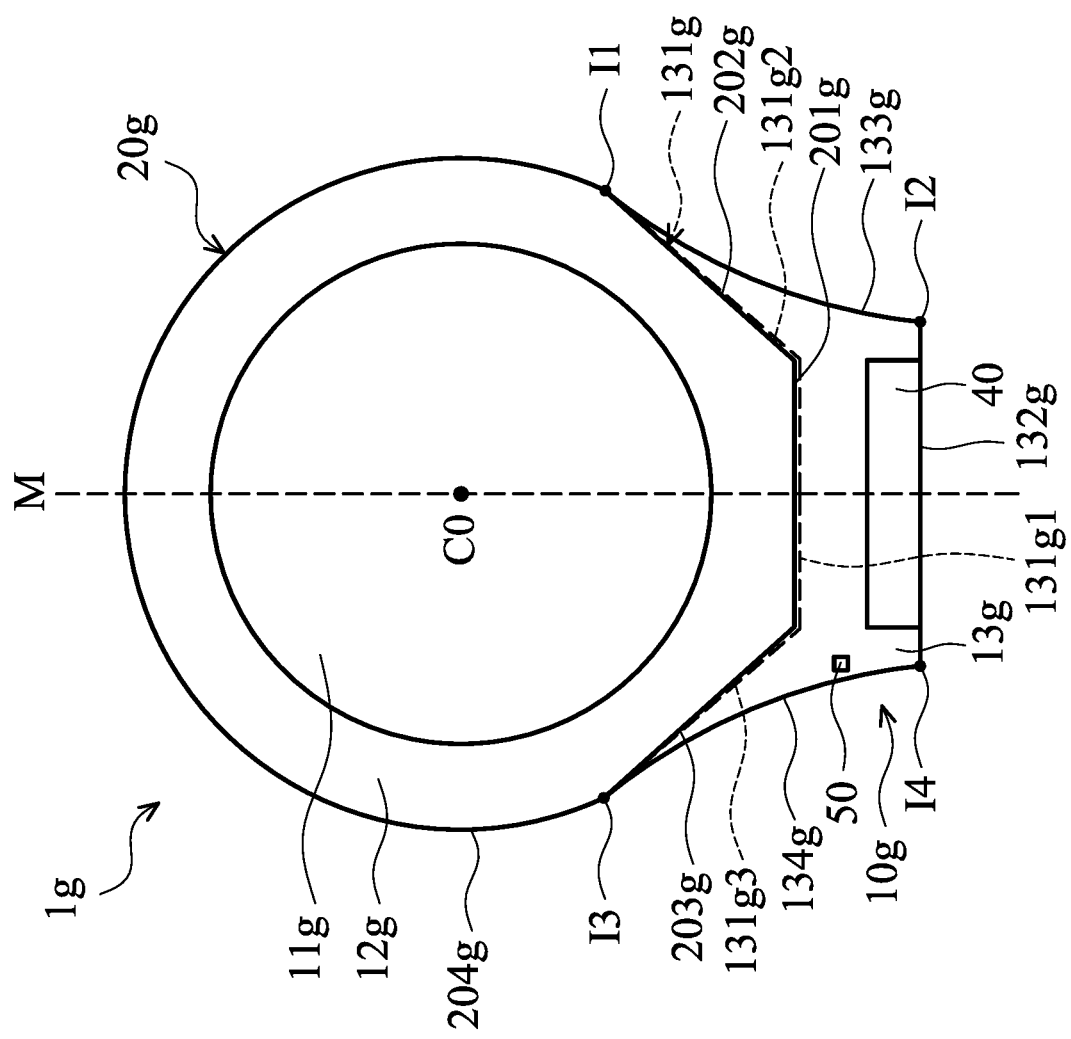
FIG. 10 shows a schematic view of a display panel, in accordance with some embodiments of the disclosure.

Referring to FIG. 10, in according to some embodiments of the disclosure, the display panel 1*g* includes a first substrate 10*g*, a second substrate 20*g*, a display layer (not shown in FIG. 10), a driving unit 40, and one or more testing pad 50, in accordance with some embodiments. The elements of the display panel 1*g* can be added or omitted, and the disclosure should not be limited by the embodiments. The second substrate 20*g* is spaced from the first substrate 10*g* by a distance and covers a partial area of the first substrate 10*g*. For example, the first substrate 10*g* has a display area 11*g*, an edge area 12*g*, and an extended area 13*g*. The second substrate 20*g* covers the display area 11*g* and the edge area 12*g* of the first substrate 10*g* and exposes the extended area 13*g*.

In some embodiments, the display area 11*g* may have a substantially round shape with a center C0 defined at a substantial center of the display area 11*g*. In addition, the edge area 12*g* completely surrounds the outer side of the display area 11*g*. The driving circuits (such as partial elements of gate drives, partial elements of data driver, and conducting lines, not shown in figures) for driving the display layer are formed on the edge area 12*g* of the first substrate 10*g*.

The extended area 13*g* extends away from the edge area 12*g* in a direction away from the display area 11*g*. The display area 11*g*, the edge area 12*g*, and the extended area 13*g* are successively arranged along a main line M. In the embodiments shown in FIG. 10, the second substrate 20*g* has a first outer edge 201*g*, a second outer edge 202*g*, a third outer edge 203*g*, and a fourth outer edge 204*g*. The first outer edge 201*g* is a straight line that is perpendicular to the main axis M. The second and third outer edges 202*g* and 203*g* are straight lines and respectively connected to two ends of the first outer edge 201*g*. An included angle is formed between the first outer edge 201*g* and each of the second and third outer edges 202*g* and 203*g*. The fourth outer edge 204*g* is a curved line with a center at the center of the circle C0 and connects to the second and third outer edges 202*g* and 203*g*.

A boundary line 131*g* of the extended area 13*g* and the edge area 12*g* is defined by projection lines of the first outer edge 201*g*, the second outer edge 202*g*, and the third outer edge 203*g*. Therefore, the boundary line 131*g* includes a first segment 131*g*1, a second segment 131*g*2, and a third segment 131*g*3 sequentially connected. Each of the first segment 131*g*1, the second segment 131*g*2, and the third segment 131*g*3 is a straight line. The first segment 131*g*1 aligns with the first outer edge 201*g*, the second segment 131*g*2 aligns with the second outer edge 202*g*, and the third segment 131*g*3 aligns with the third outer edge 203*g*.

The extended area 13*g* has a bottom edge 132*g*. The bottom edge 132*g* is located on the side of the extended area 13*g* which is away from the edge area 12*g* and is opposite from the boundary line 131*g*. In some embodiments, the bottom edge 132*g* is a straight line that is perpendicular to the main axis M passing the center C0 of the display area 11*g*.

In some embodiments, the extended area 13*g* further includes two lateral edges 133*g* and 134*g* respectively connected between two ends of the boundary line 131*g* and the two ends of the bottom edge 132*g*. Each of the two lateral edges 133*g* and 134*g* is a curved line bent toward the main axis M. The curvature radius of the two lateral edges 133*g* and 134*g* may be any value. In some embodiments, the curvature radius of the two lateral edges 133*g* and 134*g* is greater than or equal to 3 mm so as to facilitate the manufacturing of the first substrate 10*g*. The curvature radius of the lateral edge 133*g* may be the same or different from that of the lateral edge 134*g*. In some embodiments, the extended area 13*g* is symmetric to the main axis M, and the main axis M passes through the center of the boundary line 131*g* and the center of the bottom edge 132*g*.

The distance between the main axis M and an intersection I1 of the lateral edge 133*g* and the boundary line 131*g* is greater than the distance between the main axis M and an intersection I2 of the lateral edge 133*g* and the bottom edge 132*g*. The distance between the main axis M and an intersection I3 of the lateral edge 134*g* and the boundary line 131*g* is greater than the distance between the main axis M and an intersection I4 of the lateral edge 134*g* and the bottom edge 132*g*. The distance from the intersection I1 to the intersection I3 along the boundary line 131*g* is greater than the distance from the intersection I2 to the intersection I4 along the bottom edge 132*g*. In addition, along two opposite directions away from the main axis M, the distance between the boundary line 131*g* and the bottom edge 132*g* increases gradually, and is not a fixed value.

Compared with the embodiments shown in FIG. 1, with a given area of the display area 11*g*, the extended area 13*g* is closer to the center C0 of the display area 11*g* than the extended area 13*g*. Therefore, the length of the display panel 1*g* along the main axis M is smaller than the length of the display panel 1 along the main axis M. Therefore, the size of an end product using the display panel 1*g* can be decreased.

Figure 11:
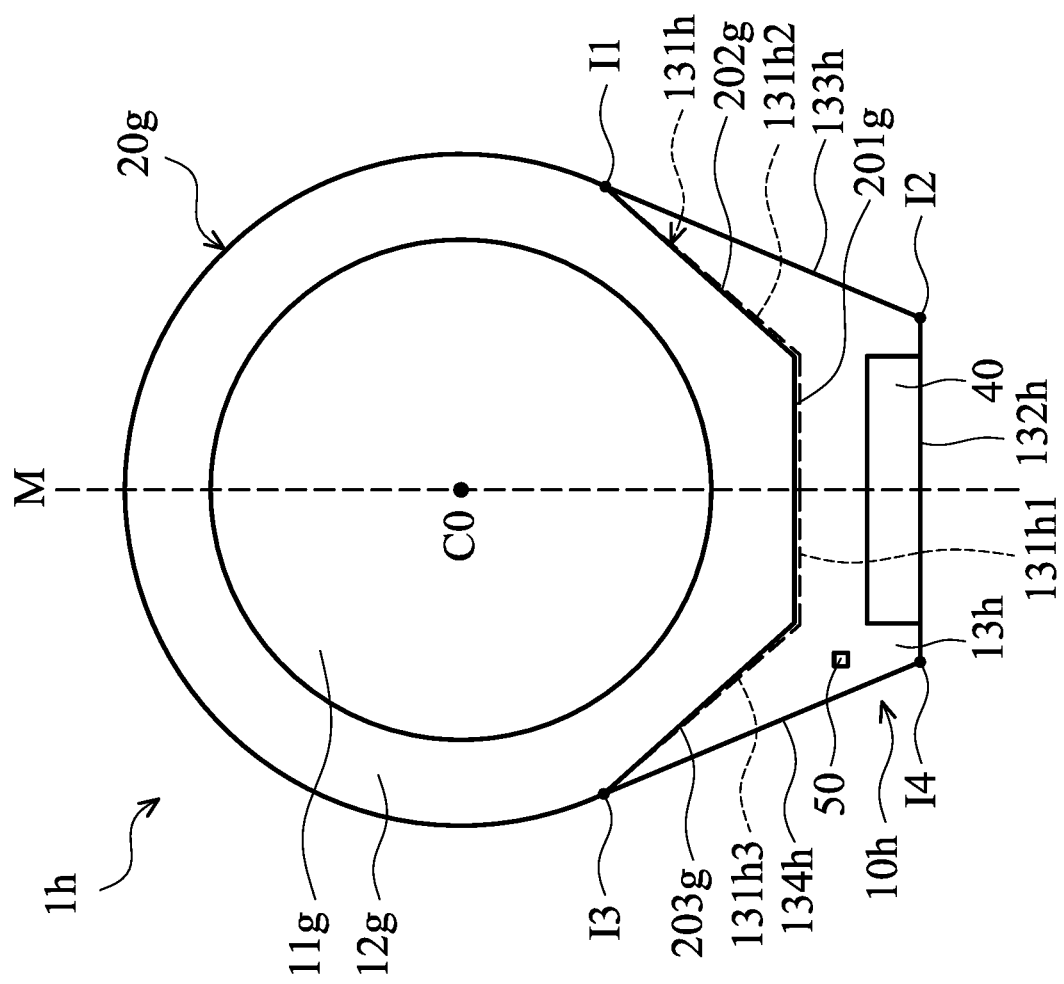
FIG. 11 shows a schematic view of a display panel, in accordance with some embodiments of the disclosure.

Referring to FIG. 11, in some embodiments, the extended area 13*h* extends away from the edge area 12*g* in a direction away from the display area 11*g*. The display area 11*g*, the edge area 12*g*, and the extended area 13*h* are successively arranged along a main line M. A boundary line 131*h* of the extended area 13*h* and the edge area 12*g* is defined by projection lines of the first outer edge 201*g*, the second outer edge 202*g*, and the third outer edge 203*g*. Therefore, the boundary line 131*h* includes a first segment 131*h*1, a second segment 131*h*2, and a third segment 131*h*3 sequentially connected. Each of the first segment 131*h*1, the second segment 131*h*2, and the third segment 131*h*3 is a straight line. The first segment 131*h*1 aligns with the first outer edge 201*g*, the second segment 131*h*2 aligns with the second outer edge 202*g*, and the third segment 131*h*3 aligns with the third outer edge 203*g*.

The extended area 13*h* has a bottom edge 132*h*. The bottom edge 132*h* is located on the side of the extended area 13*h* which is away from the edge area 12*g* and is opposite from the boundary line 131*h*. In some embodiments, the bottom edge 132*h* is a straight line that is perpendicular to the main axis M passing the center C0 of the display area 11*g*. The extended area 13*h* further includes two lateral edges 133*h* and 134*h* respectively connected between two ends of the boundary line 131*h* and the two ends of the bottom edge 132*h*. Each of the two lateral edges 133*h* and 134*h* is a straight line. The length of the lateral edge 133*h* may be the same or different from that of the lateral edge 134*h*. In some embodiments, the extended area 13*h* is symmetric to the main axis M, and the main axis M passes through the center of the boundary line and the center of the bottom edge 13*h*.

The distance between the main axis M and an intersection I1 of the lateral edge 133*h* and the boundary line 131*h* is greater than the distance between the main axis M and an intersection I2 of the lateral edge 133*h* and the bottom edge 132*h*. The distance between the main axis M and an intersection I3 of the lateral edge 134*h* and the boundary line 131*h* is greater than the distance between the main axis M and an intersection I4 of the lateral edge 134*h* and the bottom edge 132*h*. The distance from the intersection I1 to the intersection I3 along the boundary line 131*h* is greater than the distance from the intersection I2 to the intersection I4 along the bottom edge 132*h*. In addition, along two opposite directions away from the main axis M, the distance between the boundary line 131*h* and the bottom edge 132*h* increases gradually, and is not a fixed value.

Figure 12:
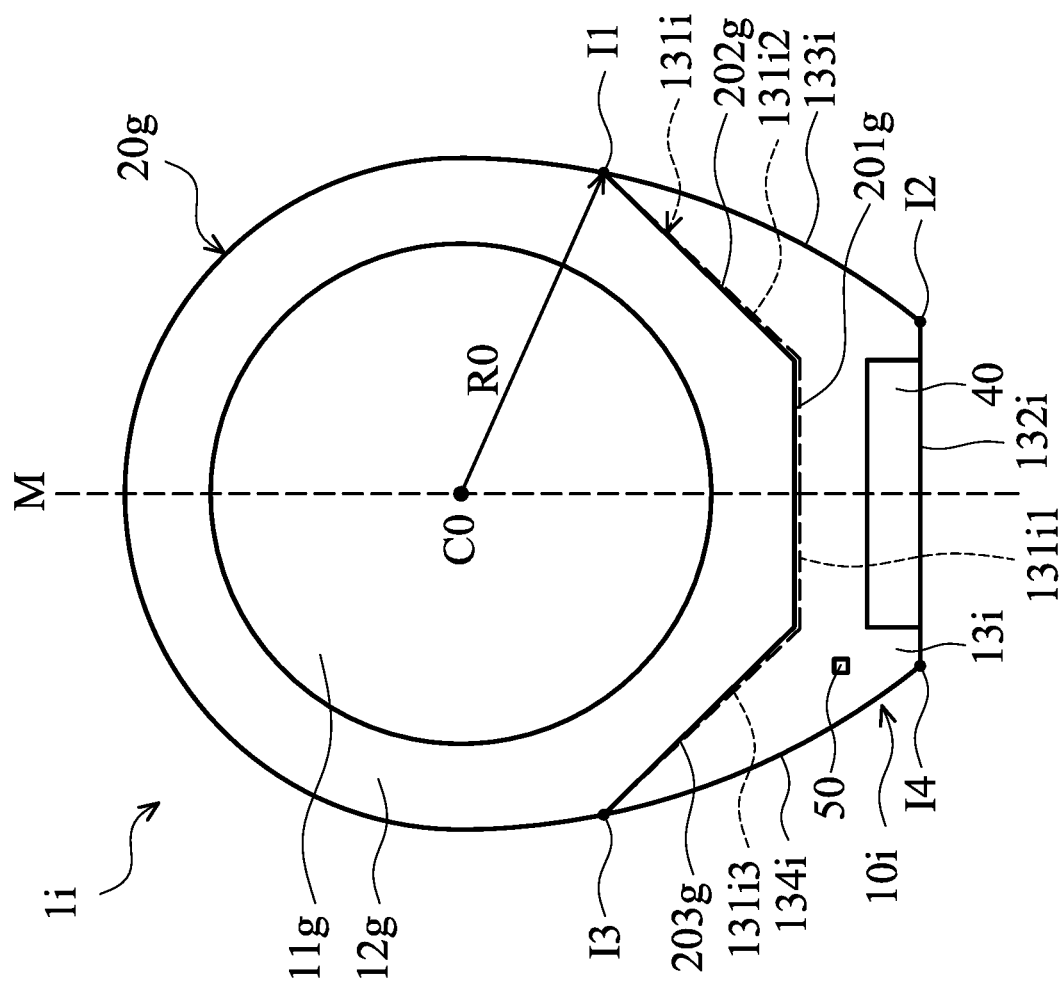
FIG. 12 shows a schematic view of a display panel, in accordance with some embodiments of the disclosure.

Referring to FIG. 12, in some embodiments, the extended area 13*i* extends away from the edge area 12*g* in a direction away from the display area 11*g*. The display area 11*g*, the edge area 12*g*, and the extended area 13*i* are successively arranged along a main line M, and the edge area 12*g* is positioned between the display area 11*g* and the extended area 13*i*. A boundary line 131*i* of the extended area 13*i* and the edge area 12*g* is defined by projection lines of the first outer edge 201*g*, the second outer edge 202*g*, and the third outer edge 203*g*. Therefore, the boundary line 131*i* includes a first segment 131*i*1, a second segment 131*i*2, and a third segment 131*i*3 sequentially connected. Each of the first segment 131*i*1, the second segment 131*i*2, and the third segment 131*i*3 is a straight line. The first segment 131*i*1 aligns with the first outer edge 201*g*, the second segment 131*i*2 aligns with the second outer edge 202*g*, and the third segment 131*i*3 aligns with the third outer edge 203*g*.

The extended area 13*i* has a bottom edge 132*i*. The bottom edge 132*i* is located on the side of the extended area 13*i* which is away from the edge area 12*g* and is opposite from the boundary line 131*i*. In some embodiments, the bottom edge 132*i* is a straight line that is perpendicular to the main axis M passing the center C0 of the display area 11.

In some embodiments, the extended area 13*i* further includes two lateral edges 133*i* and 134*i* respectively connected between two ends of the boundary line 131*i* and the two ends of the bottom edge 132*i*. Each of the two lateral edges 133*i* and 134*i* is a curved line bent toward the main axis M. The curvature radius of the two lateral edges 133*i* and 134*i* may be any value. In some embodiments, the curvature radius of the two lateral edges 133*i* and 134*i* is greater than or equal to 3 mm so as to facilitate the manufacturing of the first substrate 10*i*. The curvature radius of the lateral edge 133*i* may be the same or different from that of the lateral edge 134*i*. In some embodiments, the extended area 13*i* is symmetric to the main axis M, and the main axis M passes through the center of the boundary line 131*i* and the center of the bottom edge 132*i*.

The distance between the main axis M and an intersection I1 of the lateral edge 133*i* and the boundary line 131*i* is greater than the distance between the main axis M and an intersection I2 of the lateral edge 133*i* and the bottom edge 132*i*. The distance between the main axis M and an intersection I3 of the lateral edge 134*i* and the boundary line 131*i* is greater than the distance between the main axis M and an intersection I4 of the lateral edge 134*i* and the bottom edge 132*i*. The distance from the intersection I1 to the intersection I3 along the boundary line 131*i* is greater than the distance from the intersection I2 to the intersection I4 along the bottom edge 132*i*. In addition, along two opposite directions away from the main axis M, the distance between the boundary line 131*i* and the bottom edge 132*i* increases gradually, and is not a fixed value.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A display panel, comprising:
   a first substrate having a display area, an edge area, and an extended area, wherein the edge area is positioned between the display area and the extended area;
   a second substrate covering the display area and the edge area of the first substrate and exposing the extended area;
   a display layer positioned between the first substrate and the second substrate;
   wherein a boundary line is defined between the extended area and the edge area, and the extended area has a bottom edge and at least two lateral edges positioned between the boundary line and the bottom edge, wherein a length of the boundary line is greater than a length of the bottom edge;
   wherein one of the at least two lateral edges comprises a curved line;
   wherein a main axis passes through a center of the boundary line and a center of the bottom edge, and the curved line is bent away from the main axis;
   wherein a distance between a center of the display area and an intersection of the boundary line and the curved line is smaller than a curvature radius of the curved line.

2. The display panel as claimed in claim 1, wherein a curvature center of the one of the at least two lateral edges and the one of the at least two lateral edges itself are located on different sides of the main axis.

3. The display panel as claimed in claim 1, wherein the second substrate has a round shape, and a curvature radius of the one of the at least two lateral edges is greater than a radius of the second substrate.

4. The display panel as claimed in claim 1, wherein the extended area is symmetric to the main axis, and both the at least two lateral edges are curved lines.

5. The display panel as claimed in claim 1, further comprising a driving chip, wherein the first substrate has a first side having the display area, the edge area and the extended area, and the driving chip is disposed on the first side.

6. The display panel as claimed in claim 1, further comprising a driving chip and a circuit board, wherein the circuit board is disposed on the first substrate, and the driving chip is disposed on the circuit board.

7. The display panel as claimed in claim 6, wherein the driving chip is disposed on a surface of the circuit board that is opposite to a surface facing the first substrate.

8. A display panel, comprising:
- a first substrate having a first side and a second side opposite to the first side, wherein the first side has a display area, an edge area, and an extended area, wherein the edge area is positioned between the display area and the extended area;
- a second substrate covering the display area and the edge area, wherein the second substrate is positioned on the first substrate along a direction;
- a display layer positioned between the first substrate and the second substrate; and
- a circuit board having a first portion positioned on the extended area, a second portion corresponding to the second side, and a folded portion connected between the first portion and the second portion, wherein the first portion and second portion are at least partially overlapped along the direction;
- wherein a boundary line is defined between the extended area and the edge area, and the extended area has a bottom edge and at least two lateral edges positioned between the boundary line and the bottom edge, wherein a length of the boundary line is greater than a length of the bottom edge;
- wherein a main axis passes through a center of the boundary line and a center of the bottom edge, and one of the at least two lateral edges comprises a curved line, and the curved line is bent away from the main axis.

9. The display panel as claimed in claim 8, wherein one of the at least two lateral edges comprises a straight line.

10. The display panel as claimed in claim 8, wherein a curvature center of the one of the at least two lateral edges and the one of the at least two lateral edges itself are located on the different sides of the main axis.

11. The display panel as claimed in claim 8, wherein the second substrate has a round shape, and a curvature radius of the one of the at least two lateral edges is greater than a radius of the second substrate.

12. The display panel as claimed in claim 8, wherein a distance between a center of the display area and an intersection of the boundary line and one of the at least two lateral edges is greater than a curvature radius of the one of the at least two lateral edges.

13. The display panel as claimed in claim 8, wherein a distance between a center of the display area and an intersection of the boundary line and one of the at least two lateral edges is smaller than a curvature radius of the one of the at least two lateral edges.

14. The display panel as claimed in claim 8, further comprising a driving chip disposed on the first side and electrically connected to the circuit board.

15. The display panel as claimed in claim 8, further comprising a driving chip disposed on the circuit board.

16. The display panel as claimed in claim 15, wherein the driving chip is disposed on a surface of the circuit board that is opposite to a surface facing the first substrate.

17. A display panel, comprising:
- a first substrate having a first side and a second side opposite to the first side, wherein the first side has a display area, an edge area, and an extended area, wherein the edge area is positioned between the display area and the extended area;
- a second substrate covering the display area and the edge area, wherein the second substrate is positioned on the first substrate along a direction;
- a display layer positioned between the first substrate and the second substrate; and
- a circuit board having a first portion positioned on the extended area, a second portion corresponding to the second side, and a folded portion connected between the first portion and the second portion, wherein the first portion and second portion are at least partially overlapped along the direction;
- wherein a boundary line is defined between the extended area and the edge area, and the extended area has a bottom edge and at least two lateral edges positioned between the boundary line and the bottom edge, wherein a length of the boundary line is greater than a length of the bottom edge;
- wherein a main axis passes through a center of the boundary line and a center of the bottom edge, and one of the at least two lateral edges comprises a curved line, and the curved line is bent toward from the main axis.

18. The display panel as claimed in claim 17, wherein a curvature center of the one of the at least two lateral edges and the one of the at least two lateral edges itself are located on the same side of the main axis.

19. The display panel as claimed in claim 17, wherein the second substrate has a round shape, and a curvature radius of the one of the at least two lateral edges is greater than a radius of the second substrate.

20. The display panel as claimed in claim 17, wherein a distance between a center of the display area and an intersection of the boundary line and one of the at least two lateral edges is greater or smaller than a curvature radius of the one of the at least two lateral edges.

* * * * *